US008963354B2

(12) United States Patent
Madison (10) Patent No.: US 8,963,354 B2
(45) Date of Patent: *Feb. 24, 2015

(54) POWER RECOVERY SYSTEM USING A RANKINE POWER CYCLE INCORPORATING A TWO-PHASE LIQUID-VAPOR EXPANDER WITH ELECTRIC GENERATOR

(71) Applicant: Ebara International Corporation, Sparks, NV (US)

(72) Inventor: Joel V. Madison, Reno, NV (US)

(73) Assignee: Ebara International Corporation, Sparks, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/157,440

(22) Filed: Jan. 16, 2014

(65) Prior Publication Data

US 2014/0182291 A1    Jul. 3, 2014

Related U.S. Application Data

(63) Continuation-in-part of application No. 13/199,943, filed on Sep. 13, 2011, now Pat. No. 8,664,785.

(60) Provisional application No. 61/403,348, filed on Sep. 13, 2010.

(51) Int. Cl.
| F03B 13/00 | (2006.01) |
| F01K 11/02 | (2006.01) |
| F03G 6/00 | (2006.01) |
| F03G 7/05 | (2006.01) |
| F01K 25/10 | (2006.01) |

(52) U.S. Cl.
CPC ............... *F01K 11/02* (2013.01); *F03G 6/003* (2013.01); *F03G 7/05* (2013.01); *F01K 25/10* (2013.01); *Y02E 10/34* (2013.01)
USPC .................................. 290/43; 290/54; 290/52

(58) Field of Classification Search
CPC ........... F03G 6/003; F03G 7/05; F01K 25/10; Y02E 10/34
USPC ................................................ 290/43, 54, 52
See application file for complete search history.

(56) References Cited

U.S. PATENT DOCUMENTS

| 4,178,761 | A | * | 12/1979 | Schwartzman | .................. | 60/648 |
| 4,444,015 | A | * | 4/1984 | Matsumoto et al. | ............ | 60/648 |
| 4,558,228 | A | * | 12/1985 | Larjola | ............................ | 290/52 |
| 4,995,234 | A | * | 2/1991 | Kooy et al. | ........................ | 60/648 |
| 7,028,481 | B1 | * | 4/2006 | Morrow | ............................ | 60/649 |
| 7,406,830 | B2 | * | 8/2008 | Valentian et al. | ............... | 62/50.2 |
| 8,661,820 | B2 | * | 3/2014 | Mak | ................................ | 60/651 |
| 8,664,785 | B2 | * | 3/2014 | Madison | ........................ | 290/43 |

* cited by examiner

*Primary Examiner* — Tho D Ta
(74) *Attorney, Agent, or Firm* — Ray K. Shahani; Kin Hung Lai (57) ABSTRACT

A power recovery system using the Rankine power cycle incorporating a two-phase liquid-vapor expander with an electric generator which further consists of a heat sink, a heat source, a working fluid to transport heat and pressure energy, a feed pump and a two-phase liquid-vapor expander for the working fluid mounted together with an electric generator on one rotating shaft, a first heat exchanger to transport heat from the working fluid to the heat sink, a second heat exchanger to transport heat from the heat source to the working fluid.

9 Claims, 12 Drawing Sheets

POWER RECOVERY SYSTEM USING A RANKINE POWER CYCLE INCORPORATING A TWO-PHASE LIQUID-VAPOR EXPANDER WITH ELECTRIC GENERATOR

RELATED APPLICATIONS

This application is a continuation-in-part application of pending U.S. patent application Ser. No. 13/199,943, filed Sep. 13, 2011 entitled "POWER RECOVERY SYSTEM USING A RANKINE POWER CYCLE INCORPORATING A TWO-PHASE LIQUID-VAPOR EXPANDER WITH ELECTRIC GENERATOR", which is a non-provisional application of and related to U.S. Provisional Patent Application Ser. No. 61/403,348 filed Sep. 13, 2010 entitled POWER RECOVERY SYSTEM USING A RANKINE POWER CYCLE INCORPORATING A TWO-PHASE LIQUID-VAPOR EXPANDER WITH ELECTRIC GENERATOR, which are both incorporated herein by reference in their entirety, and claim any and all benefits to which they are entitled therefrom.

FIELD OF THE INVENTION

The present invention pertains to an LNG regasification system that utilizes power recovery, and more specifically, to such system incorporating a two-phase expander generator that generates electrical energy during regasification.

BACKGROUND OF THE INVENTION

Liquefied natural gas, hereafter "LNG", is natural gas that has been converted at least temporarily to liquid phase for ease of storage or transport. LNG takes up about 1/600th the volume of natural gas in the vapor or gaseous phase. The reduction in volume makes it much more cost efficient to transport over long distances where pipelines may or may not exist. In certain cases where moving natural gas by pipeline is not possible or economical, LNG can be transported by specially designed cryogenic sea vessels known as "LNG carriers" or "cryogenic road tankers".

The conventional regasification process for onshore and offshore plants incorporates two major elements:
1. High-pressure send-out pumps to bring the pressure of the LNG up from relatively low storage pressure through the vaporizer to relatively high pipe line pressure; and
2. The vaporizer/expander to transform the LNG into gaseous natural gas.

The LNG regasification process consists of the steps of unloading LNG vessels at the receiving terminal and storing LNG in insulated tanks at atmospheric pressure at a temperature in the range of 111 Kelvin [K], which is around minus 170 Celsius [C]. During the regasification process, LNG is pumped to a high pressure by a cryogenic, high-pressure LNG pump or similar equipment while it is still in the liquid state. The LNG is then heated until it vaporizes into its gaseous state. In common commercial practice, the heat source used in regasification of LNG is provided by local sea water. The naturally stored "heat" in sea water is a heat source for heating and vaporizing LNG.

Cryogenic high-pressure LNG pumps are used for pressurizing the fluid up to the high pipe line pressure while it is still in the liquid state. Typical dimensions for these types of pumps are 4 meters in height and 1 meter in diameter, with as many as 12 or more centrifugal pump impeller stages, each of up to 300 mm or more diameter.

Figure 1:
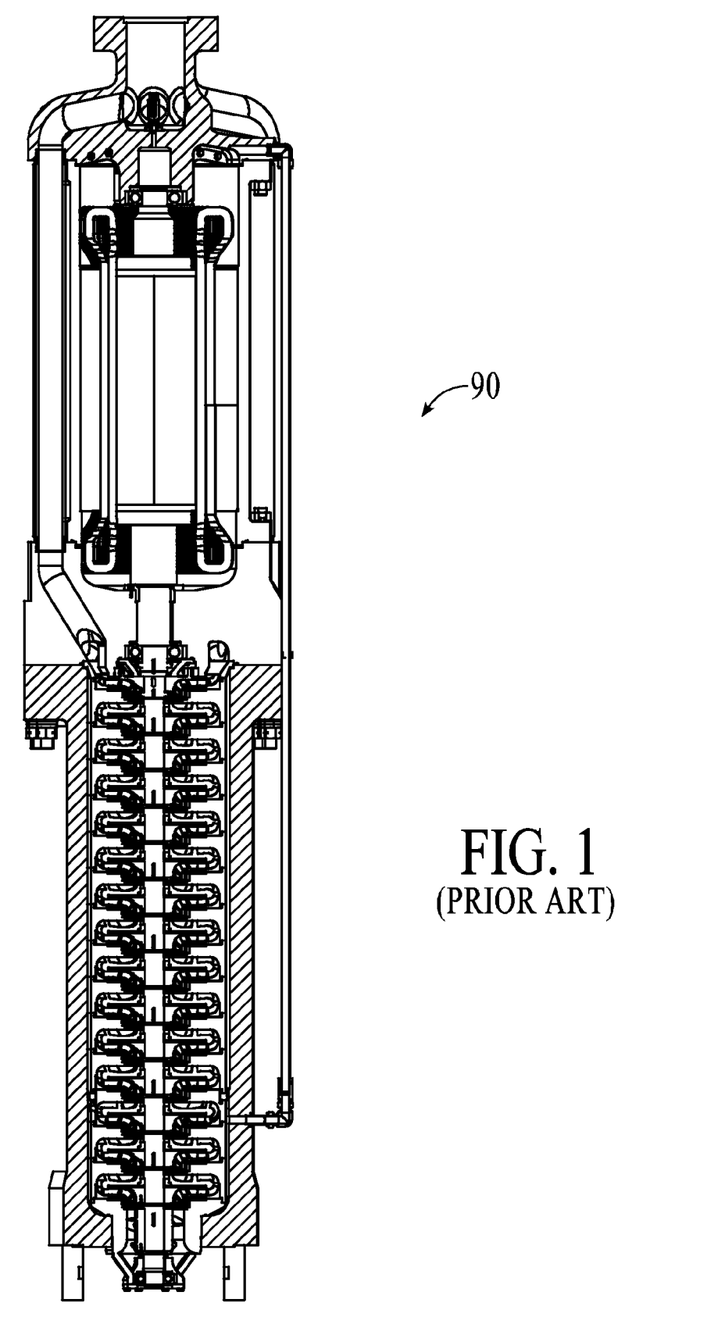
FIG. 1 (prior art) shows a particular design of an existing high-pressure, centrifugal LNG pump.

FIG. 1 (prior art) shows a particular design of an existing high-pressure, centrifugal LNG pump. Its design features the single piece, rotating axial shaft with integrally mounted multi-stage pump hydraulics and electrical induction motor. The thrust balancing mechanism is incorporated into the pump to eliminate high axial thrust forces on the bearings. The electrical induction motor is submerged in and cooled by LNG, and the ball bearings are lubricated and cooled by LNG.

General, high-pressure pump design criteria is summarized as follows:

| Pump General Design Criteria | | |
|---|---|---|
| Liquid | | LNG |
| Model | | 6ECC-1212 |
| Pump Design Pressure | [bara] | 133.4 |
| Lowest Design Temperature | [° C.] | −168 |
| Operating Temperature | [° C.] | −147 |
| Rated Flow | [m³/hr] | 287 |
| Rated Differential Head | [m] | 2396 |
| Rated Density | [kg/m³] | 417.417 |
| Maximum Design Density | [kg/m³] | 451.00 |

Typical LNG regasification plants require large heat sinks that necessitate large heat sources. Temperature differentials between heat sources, e.g., seawater, and heat sinks, e.g., LNG, are in the range of 170° Celsius, thus providing feasible preconditions for an efficient recovery of power. There have been past attempts to recover some of the input energy used during the LNG regasification process. One common limitation is that the energy recovered using a common one-phase [liquid] turbine and generator combination, from just the vapor or gaseous state of LNG, is very ineffective. However, in a two-phase [liquid, gas] process, the combination of high pressure and mechanical turbulence created and the presence of liquid droplets of LNG is highly corrosive or abrasive, and will damage the equipment used in most current regasification plants.

The Rankine power cycle is a cycle that converts heat into work. Heat is supplied externally to a closed loop of working fluid, such as water. The working fluid is heated, vaporized, used to drive a steam turbine to generate electrical power, re-condensed to liquid by cooling, and the cycle is repeated. This cycle generates about 80% of all electric power used throughout the world, including virtually all solar thermal, biomass, coal and nuclear power plants.

The Rankine power cycle describes a model of steam operated heat engine most commonly found in power generation plants. Common heat sources for power plants using the Rankine power cycle are the combustion of coal, natural gas and oil, and nuclear fission.

There is nothing in the prior art that teaches a system which converts heat from a heat source to work incorporated into an LNG regasification process. The need exists to incorporate a reduction generator, where the work is further converted into electrical energy, to recovers some of the energy input to the LNG during the regasification process. There are currently no power plants in operation in which the working fluid is LNG and the heat source is mainly sea water, wherein the entire process operates at a much lower temperature than that utilized in conventional power generation plants.

SUMMARY OF INVENTION AND ADVANTAGES

The present invention is a power recovery system using a Rankine power cycle, incorporating a compact design which consists of a pump, a two-phase LNG expander and an induction generator, integrally mounted on one single rotating shaft. The present invention incorporates a power recovery system to partially regain the input energy used in the overall regasification process.

One object of the present invention is to provide an efficient and economical power recovery for LNG regasification plants.

An object and advantage of the present invention is that the expander work output is larger than the pump work input and the difference in work is converted by the generator into electrical energy as power recovery.

Yet another object and advantage of the present invention is that the losses of a separate pump motor are eliminated.

Yet a another object and advantage of the present invention is to recover and use the losses of the induction generator as a heat source to heat the working fluid, such as LNG or LPG, in addition to the heat from sea water and other heat sources.

Yet another object and advantage of the present invention is that any leakages of the working fluid is within a closed loop and occurs only between pump and expander.

Yet another object and advantage of the present invention is that any leakages of the working fluid is minimized due to equal pressure on both sides of the seal, and small leakages are within a closed loop and occur only between pump, expander and generator.

Yet another object and advantage of the present invention is that the axial thrust is minimized due to opposing directions of the thrust forces decreasing the bearing friction and increasing the bearing life.

Benefits and features of the invention are made more apparent with the following detailed description of a presently preferred embodiment thereof in connection with the accompanying drawings, wherein like reference numerals are applied to like elements.

DETAILED DESCRIPTION OF THE PREFERRED EMBODIMENT

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

Power Recovery:

LNG regasification plants require large heat sinks that necessitate large heat sources. The differences in temperature between the heat sources and the heat sinks are in the range of 170° Celsius providing the preconditions for an efficient recovery of power. The Rankine power cycle is a thermodynamic cycle which converts heat into work. The heat is supplied externally to a closed loop with a particular working fluid, and also requires a heat sink. This cycle generates about 80% of all global electric power.

Figure 2A:
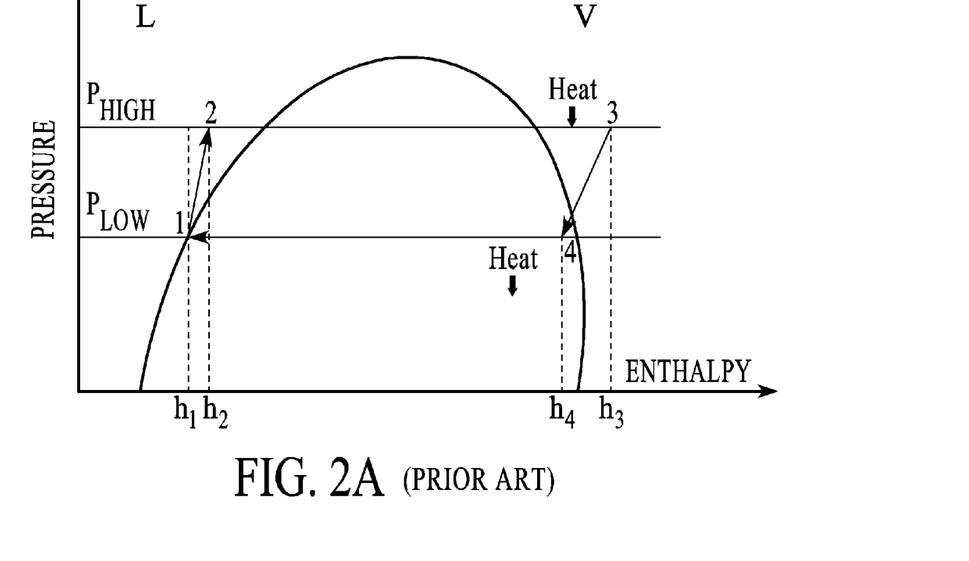
FIG. 2A (prior art) is a representative pressure-enthalpy diagram, hereafter "P-h diagram", showing an Rankine power cycle with single phase vapor expansion.

FIG. 2A (prior art) is a representative pressure-enthalpy diagram, hereafter "P-h diagram", showing an Rankine power cycle with single phase vapor expansion. The Rankine power cycle is shown using a typical Mollier diagram with the pressure p over the enthalpy h.

As shown in FIG. 2A, the ideal Rankine power cycle with single phase vapor expansion consists of the following four process steps:

1→2 Isentropic compression of the liquid fluid to a high pressure in a pump. The working fluid is pumped from low to high pressure, as the fluid is a liquid at this stage the pump requires little input energy.

2→3 Constant high pressure heat addition in a boiler to completely vaporize the fluid. The high pressure liquid enters a boiler where it is heated at constant pressure by an external heat source to become a dry saturated vapor, thus one-phase. The input energy required can be easily calculated using Mollier diagram or h-s chart or enthalpy-entropy chart also known as steam tables.

3→4 Isentropic expansion in a turbine gas expander to low pressure. The dry saturated vapor expands through a turbine, generating [recovering] power. This decreases the temperature and pressure of the vapor, and some condensation may occur. The output in this process can be easily calculated using the enthalpy-entropy chart or the steam tables.

4→1 Constant low pressure heat rejection in a condenser to re-liquefy the fluid. The wet vapor then enters a condenser where it is condensed at a constant temperature to become a saturated liquid.

The Rankine power cycle illustrated in FIG. 2A represents a one-phase expansion which happens in most power plants as current turbines and expanders do not tolerate highly pressurized working liquid droplets during step 3 to 4.

Figure 2B:
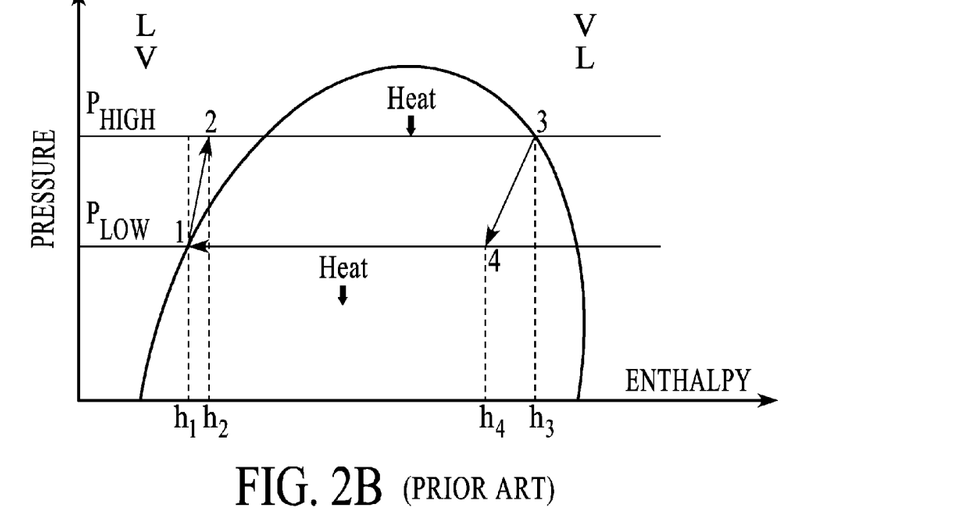
FIG. 2B is a representative P-h diagram showing the Rankine power cycle of an embodiment of the present invention with high vapor content two-phase expansion.
Figure 2C:
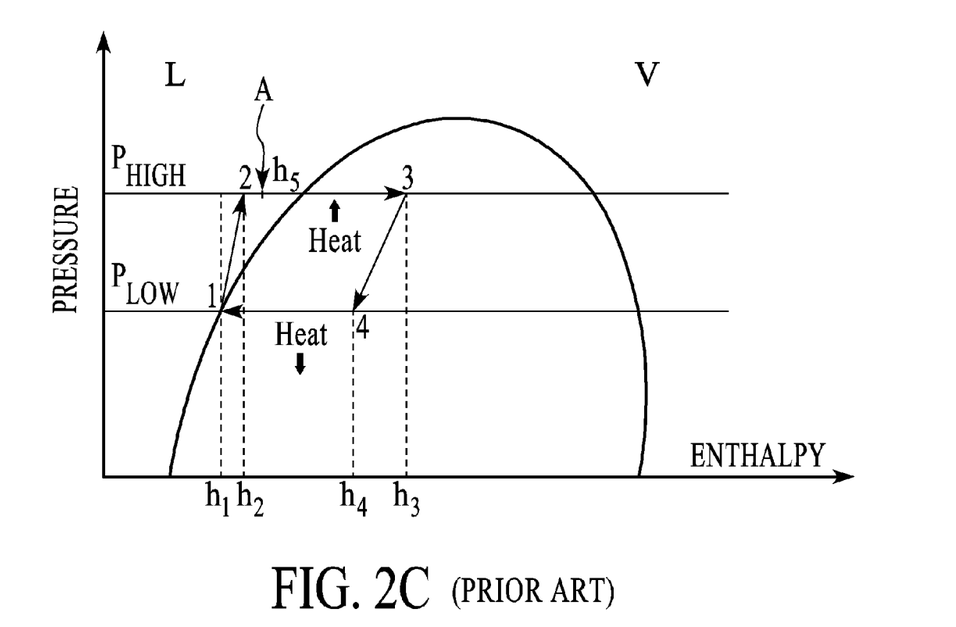
FIG. 2C is a representative P-h diagram showing the Rankine power cycle of an embodiment of the present invention with low vapor content two-phase expansion.

The symbols $h_1$, h2, h3 and h4 in FIGS. 2A, 2B and 2C represent the enthalpy of steps 1, 2, 3 and 4, respectively. The thermodynamic efficiency $\eta_{therm}$ of any Rankine power cycle is the ratio of the net power output Wnet to the heat input qin. The net power output $w_{out}$ from the expander and the work input $w_{in}$ to the pump. $\eta_{therm}$ is calculated as follows:

Specific work input to pump: $w_{in}=h2-h1$

Specific work output from expander: $w_{out}=h3-h4$

Specific heat input from step 2 to step 3: $q_{in}=h3-h2$

Net power output: $w_{net}=w_{out}-w_{in}$

The thermodynamic efficiency of the ideal cycle is the ratio of net power output to heat input:

$\eta_{therm}=w_{net}/q_{in}$ $\eta_{therm}=1-(h4-h1)/(h3-h2)$

In one embodiment, the higher the thermodynamic efficiency of the Rankine power cycle, the more power is recovered.

In an ideal Rankine power cycle, the pump and turbine would be isentropic, i.e., the pump and turbine would generate no entropy and hence maximize the net work output. Processes 1-2 and 3-4 would be represented by vertical lines on the T-S diagram and more closely resemble that of the Carnot cycle.

FIG. 2B is a representative P-h diagram showing the Rankine power cycle of an embodiment of the present invention with high vapor content two-phase expansion. The two-phase fluid ideal Rankine power cycle with liquid-vapor two-phase expansion consists basically of the same four steps 1 to 4, with the difference that the pressurized liquid is only partially vaporized thus remaining within the saturation dome. Thus, in step 3 the isentropic expansion of the liquid-vapor mixture is achieved in a two-phase fluid expander. Since both (h4−h1) and (h3−h2) decrease, the thermodynamic efficiency $\eta_{therm}$ increases for the Rankine power cycle.

FIG. 2C is a representative P-h diagram showing the Rankine power cycle of an embodiment of the present invention with low vapor content two-phase expansion. As h3 and h4 continue to shift towards the pressure axis, the pressurized working fluid in step 3 is heated to a lower temperature. Thus, lower heat input (h3−h2) is required and the vapor content of the working fluid during step 3 is higher compared to that shown in the Rankine power cycle of FIG. 2B. In turn, the heat output (h4−h1) during step 4 and 1 also decreases. The work output (h3−h4) remains in a relatively consistent range, hence the overall thermodynamic efficiency increases. Theoretically, the further step 3 and step 4 are shifted towards the pressure axis, the more efficient the Rankine power cycle will be. In reality, the higher the vapor content of the working fluid in step 3, the more damage likely to be caused to the turbines and expanders by the liquid present in the working fluid.

Figure 3A:
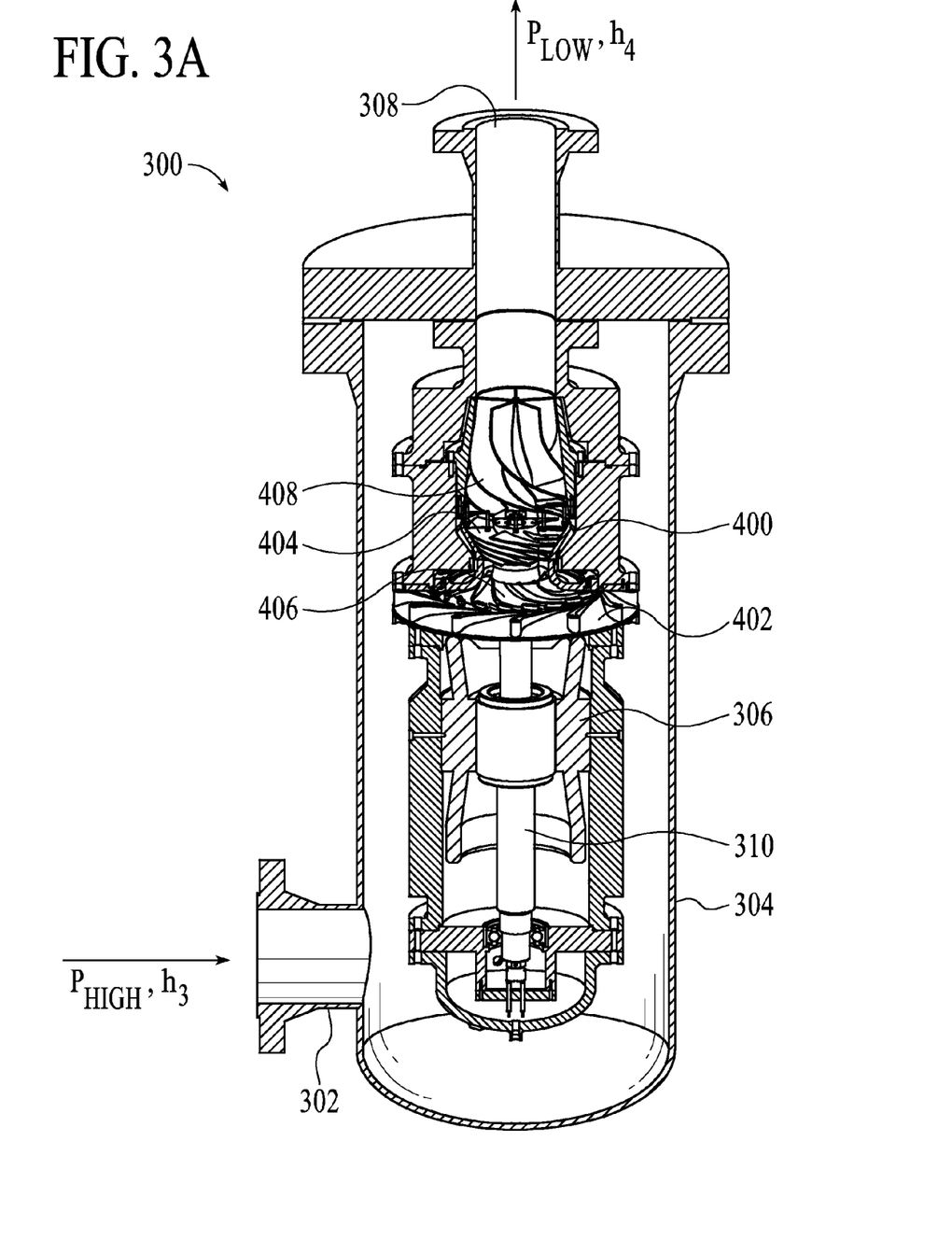
FIG. 3A is a representative exposed isometric view of a two-phase expander generator 300 of the present invention 100.
Figure 3B:
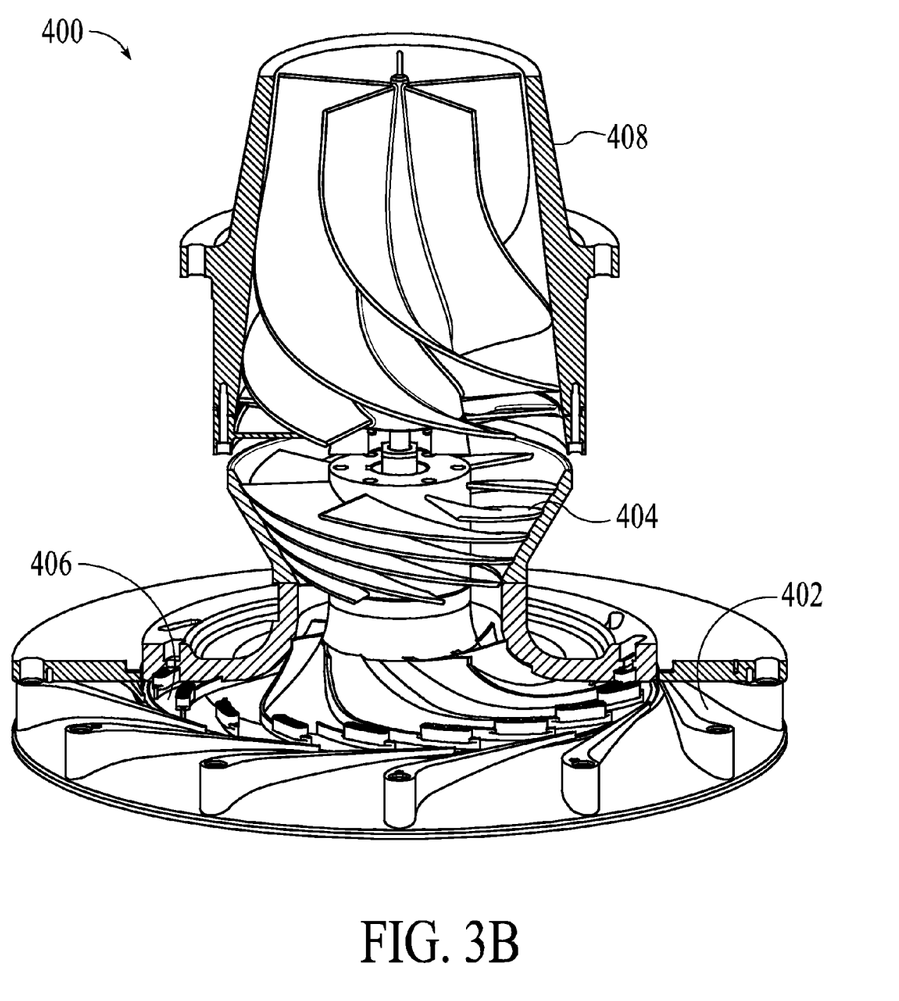
FIG. 3B is a representative partial isometric view of the two-phase hydraulic assembly 400 shown in FIG. 3A.

Two-Phase Expander Generator:

FIG. 3A is a representative exposed isometric view of a two-phase expander generator 300 of the present invention 100. FIG. 3B is a representative partial isometric view of the two-phase hydraulic assembly 400 shown in FIG. 3A. In one embodiment, the two-phase expander generator 300 is used to perform step 3 to step 4 of the two-phase Rankine power cycle in FIGS. 2B and 2C. The main reason that the two-phase expander generator 300 can tolerate a working fluid having high vapor content is that its design enables the kinetic energy of the high pressure two-phase working fluid to dissipate at the very end and top portion in the two-phase hydraulic assembly 400, hence minimizing physical harm and corrosion to the equipment.

In one embodiment, the two-phase expander generator 300 of the present invention consists of a two-phase hydraulic assembly 400 mounted on a rotating, axial shaft 310. As shown in FIG. 3B, two-phase hydraulic assembly 400 further consists of non-rotating nozzle ring 402 on the bottom, followed by the rotating reaction turbine runner 406 with jet exducer 404 mounted on top. On top of jet exducer 404, the non-rotating two-phase draft tube 408 is mounted. In one embodiment, induction generator 306 is also mounted on rotating axial shaft 310 underneath the two-phase hydraulic assembly 400. The entire embodiment is completely encased inside pressurized containment vessel 304. As best shown in FIG. 3A, high pressure working fluid is pumped into two-phase expander generator 300 at lower inlet 302. The working fluid travels upward passing induction generator 306, losing pressure along the way. It then enters two-phase hydraulic assembly 400 at nozzle ring 402, dissipating its internal and kinetic energy along the way to drive rotating axial shaft 310 and exits at upper outlet nozzle 308 with less pressure and lower enthalpy. The rotation of rotating axial shaft 310 drives induction generator 306, generating electrical energy, i.e., power recovery.

Figure 3C:
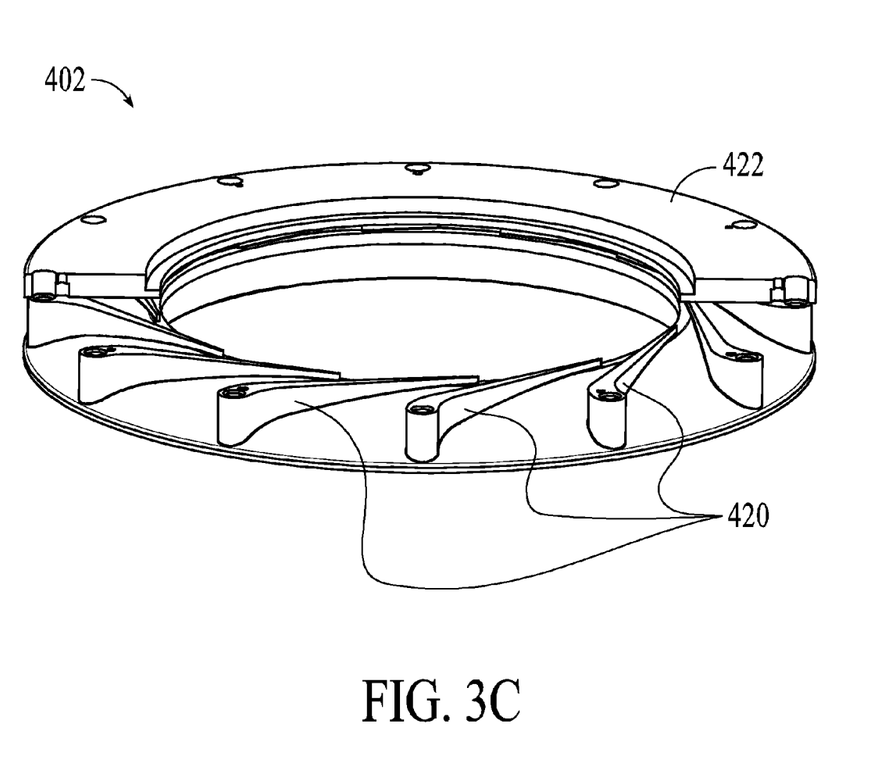
FIG. 3C is a representative enlarged isometric view of nozzle ring 402 of the two phase hydraulic assembly 400 shown in FIG. 3A.

FIG. 3C is a representative enlarged isometric view of the nozzle ring 402 of the two phase hydraulic assembly 400 shown in FIG. 3A. In one embodiment, the stationery or non-rotating nozzle ring 402 has upper plate 422 enclosing converging nozzles 420 to generate a high velocity vortex flow of the incoming working fluid.

Figure 3D:
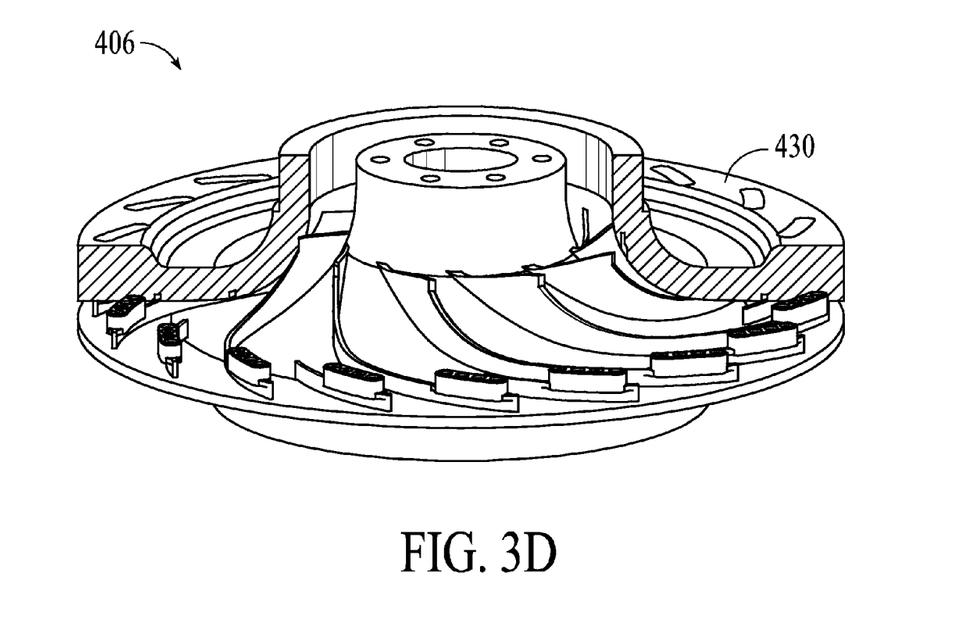
FIG. 3D is a representative enlarged isometric view of jet exducer 404 of the two phase hydraulic assembly 400 shown in FIG. 3A.

FIG. 3D is a representative enlarged isometric view of the reaction turbine runner 406 of the two-phase hydraulic assembly 400 shown in FIG. 3A. In one embodiment, the rotating reaction turbine runner 406 and stationary housing portion 430 converts the angular fluid momentum of the vortex flow coming out of nozzle ring 402 into shaft torque of rotating axial shaft 310.

Figure 3E:
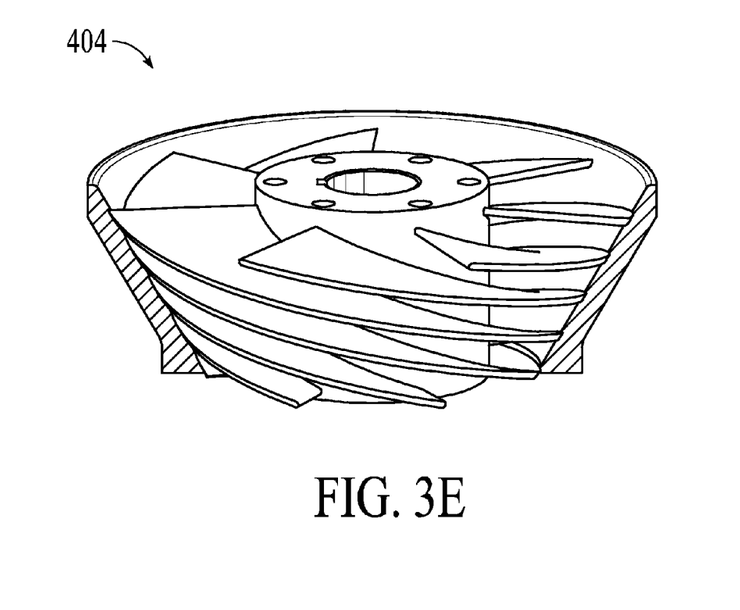
FIG. 3E is a representative enlarged isometric view of reaction turbine runner 406 of the two-phase hydraulic assembly 400 shown in FIG. 3A.

FIG. 3E is a representative enlarged isometric view of the jet exducer 404 of the two phase hydraulic assembly 400 shown in FIG. 3A. As shown in FIG. 3E, the rotating jet exducer 404 is a radial outflow turbine mounted on top of reaction runner 406 for generating additional rotating axial shaft 310 torque by an angular fluid momentum in a direction opposite to that of the nozzle ring 402 with a near isentropic, two-phase expansion to the lower pressure of exiting working fluid.

Figure 3F:
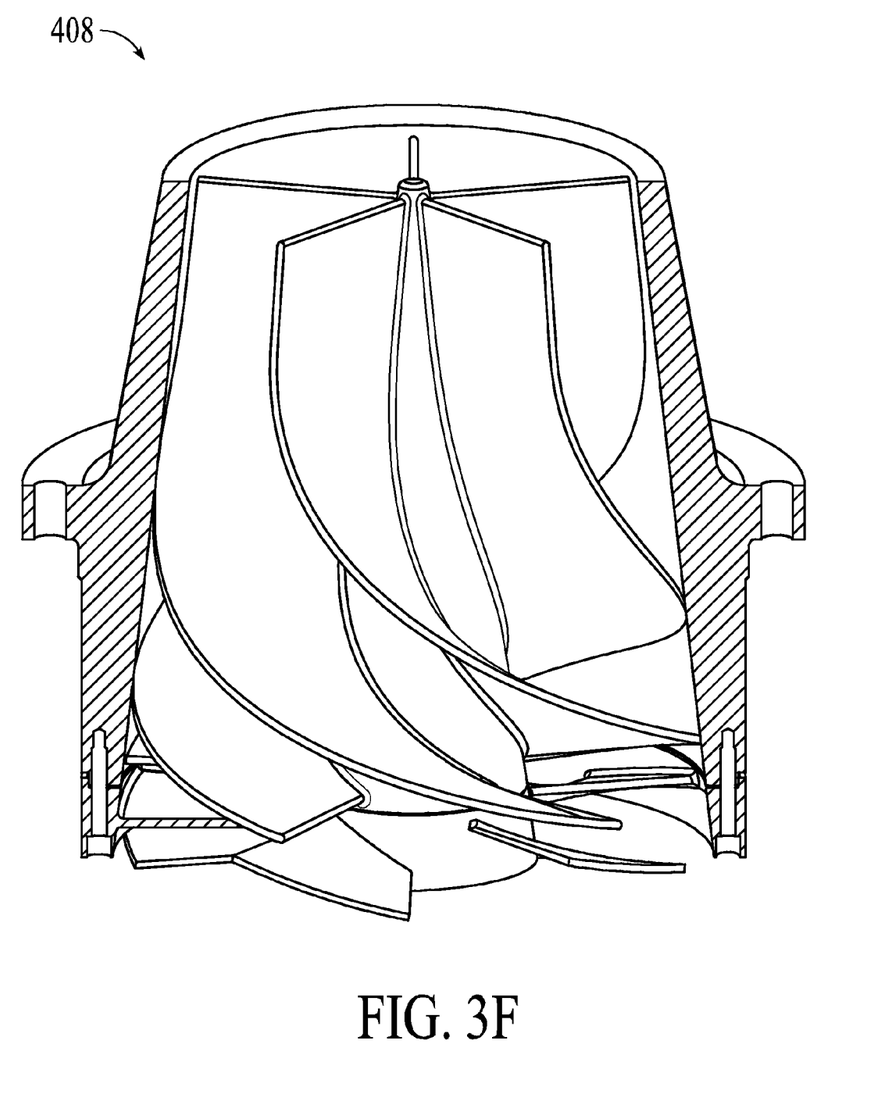
FIG. 3F is a representative enlarged isometric view of two-phase expander draft tube 408 of the two-phase hydraulic assembly 400 shown in FIG. 3A.

FIG. 3F is a representative enlarged isometric view of a two-phase expander draft tube 408 of the two-phase hydraulic assembly 400 shown in FIG. 3A. As shown in FIG. 3F, the non-rotating two-phase draft tube 408 recovers energy by converting the remaining rotational kinetic energy of the working fluid into static pressure energy, or "thrust".

Power Generation/Recovery:

The generated theoretical maximum mechanical specific power per mass $P_{max}$ of two-phase expander generator 300 driven by ideal working fluids is equal to the product of specific volumetric flow per second $v_s$ and the pressure difference $\Delta p$ [$P_{high}-P_{low}$] between inlet 302 and outlet 308 as follows:

$$P_{max}[\text{J}/(\text{kg s})]=v_s[\text{m}^3/(\text{kg s})]\Delta p[\text{Pa}]$$

However, for expander generator 300 driven by real fluids, like compressible liquids, gases, and liquid-vapor mixtures, the specific volume v in m³/kg is not constant and changes with the momentary pressure p and the enthalpy h as follows:

$$v=v[h,p]$$

The theoretical maximum differential enthalpy Δh for a small differential expansion pressure dp is described by the following differential equation:

$$\Delta h=v[h,p]\Delta p$$

The generated theoretical maximum specific power is then calculated by integrating this differential equation Δh=h[p]. The corresponding power output in kJ/s is Δh in kJ/kg multiplied by the mass flow in kg/s.

Figure 4:
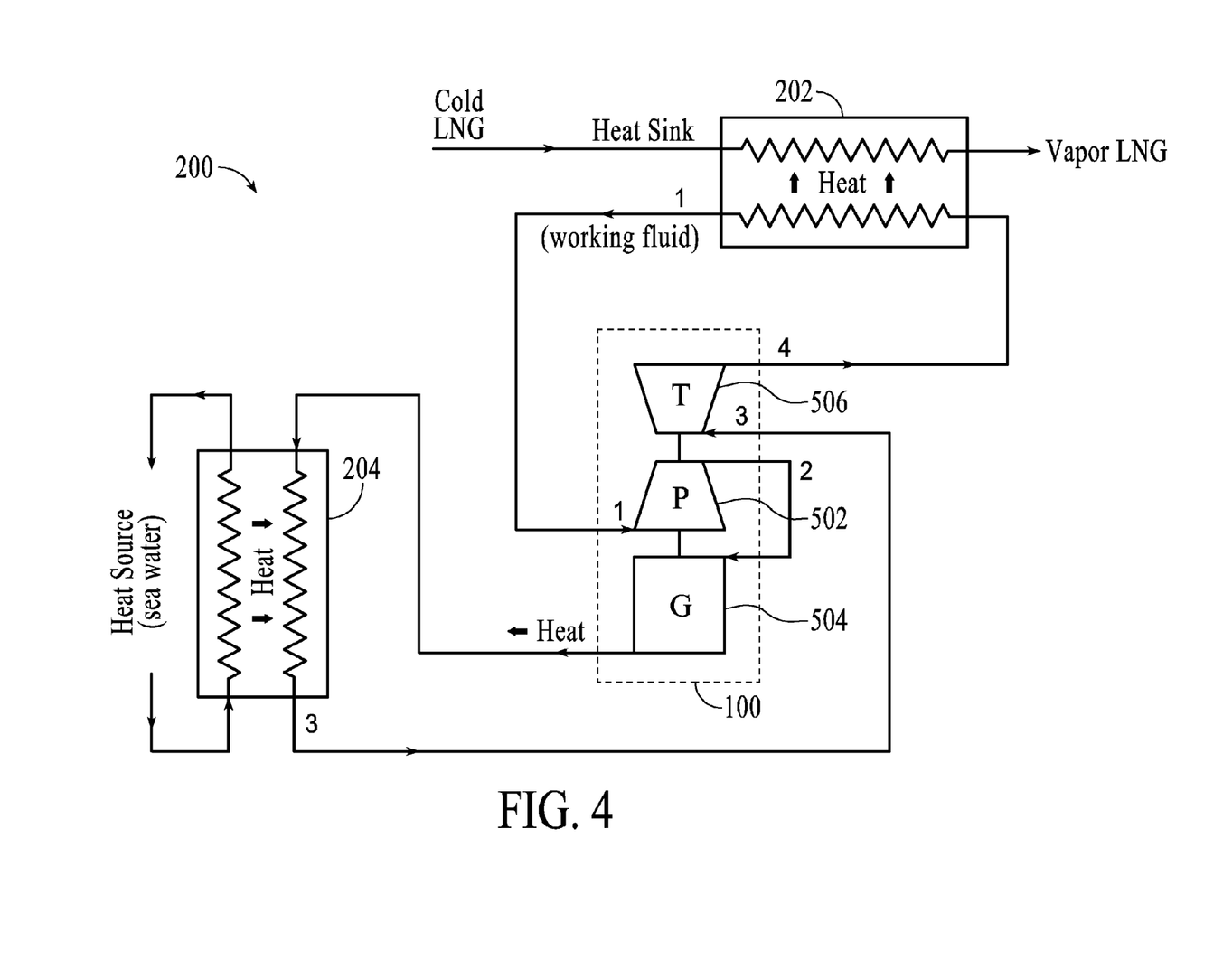
FIG. 4 is a representative schematic diagram showing the Rankine power cycle power recovery system of the present invention 200 using two-phase expansion.

Two-Phase Rankine Power Cycle:

For power recovery using a two-phase fluid Rankine power cycle, as best shown in FIGS. 2B and 2C, in LNG regasification plants, several field proven working fluids are available and used in similar applications. As best shown in FIG. 4, to achieve a higher thermodynamic efficiency $\eta_{therm}$, the two-phase working fluid passes through two heat exchangers 202 and 204, and one pump two-phase expander generator 100.

In one embodiment, pump two-phase expander generator 100 of the present invention resembles two-phase expander generator 300 as best shown in FIGS. 3A to 3F. The one added embodiment is a pump 502. The compact assembly comprises a pump 502, a two-phase expander 506 and an induction generator 504 integrally mounted on one rotating shaft 508.

FIG. 4 is a representative schematic diagram showing the Rankine power cycle power recovery system of the present invention 200 using two-phase expansion. Process steps shown in FIG. 4 correspond to the four described process steps of the two-phase Rankine power cycle shown in FIGS. 2B and 2C. The system of the present invention 200 consists of heat sink 202, heat source 204 and pump two-phase expander generator 100 that further consists of pump 502, induction generator 504 and two-phase expander 506.

Step 1 to 2:

Working fluid in liquid phase enters pump 502 and by receiving work input, pump 502 pressurizes the liquid single phase working fluid from low pressure $P_{LOW}$ to high pressure $P_{HIGH}$.

Step 2 to 3:

The pressurized single phase working fluid passes through generator 504 internally and working fluid is heated and partially vaporized by passing through induction generator 504, as represented by point A in FIG. 2C. It subsequently flows out of pump two-phase expander generator 100 to an outside heat source 204. In one embodiment, heat source is sea water which has a much higher temperature than the working fluid, LNG or liquid propane gas, LPG. In other embodiments, the heat provided at the heat source 204 can be from other sources depending on the regasification plant.

Step 3 to 4:

The pressurized and heated two-phase saturated working fluid in step 3 flows back to the pump two-phase expander generator 100 at two-phase expander 506 where it expands and drops in pressure from high pressure $P_{high}$ to low pressure $P_{low}$, generating a work output. Part of the kinetic energy and internal energy of the heated two-phase saturated fluid is converted to electrical energy when working fluid from two-phase expander 506 drives induction generator 504.

Step 4 to 1:

The low pressure two-phase saturated working fluid flows out of pump two-phase expander generator 100 at two-phase expander 506 and passes through an external heat sink 202. The process of regasification of LNG occurs at heat sink 202. The low pressure two-phase saturated working fluid takes heat from the colder LNG at the heat sink 202. While the working fluid condenses from saturated liquid-vapor two-phase to non-saturated liquid single phase, it serves as the heat source for the LNG regasification process and the LNG at the heat sink 202 is heated and partly or completely vaporized.

Figure 5A:
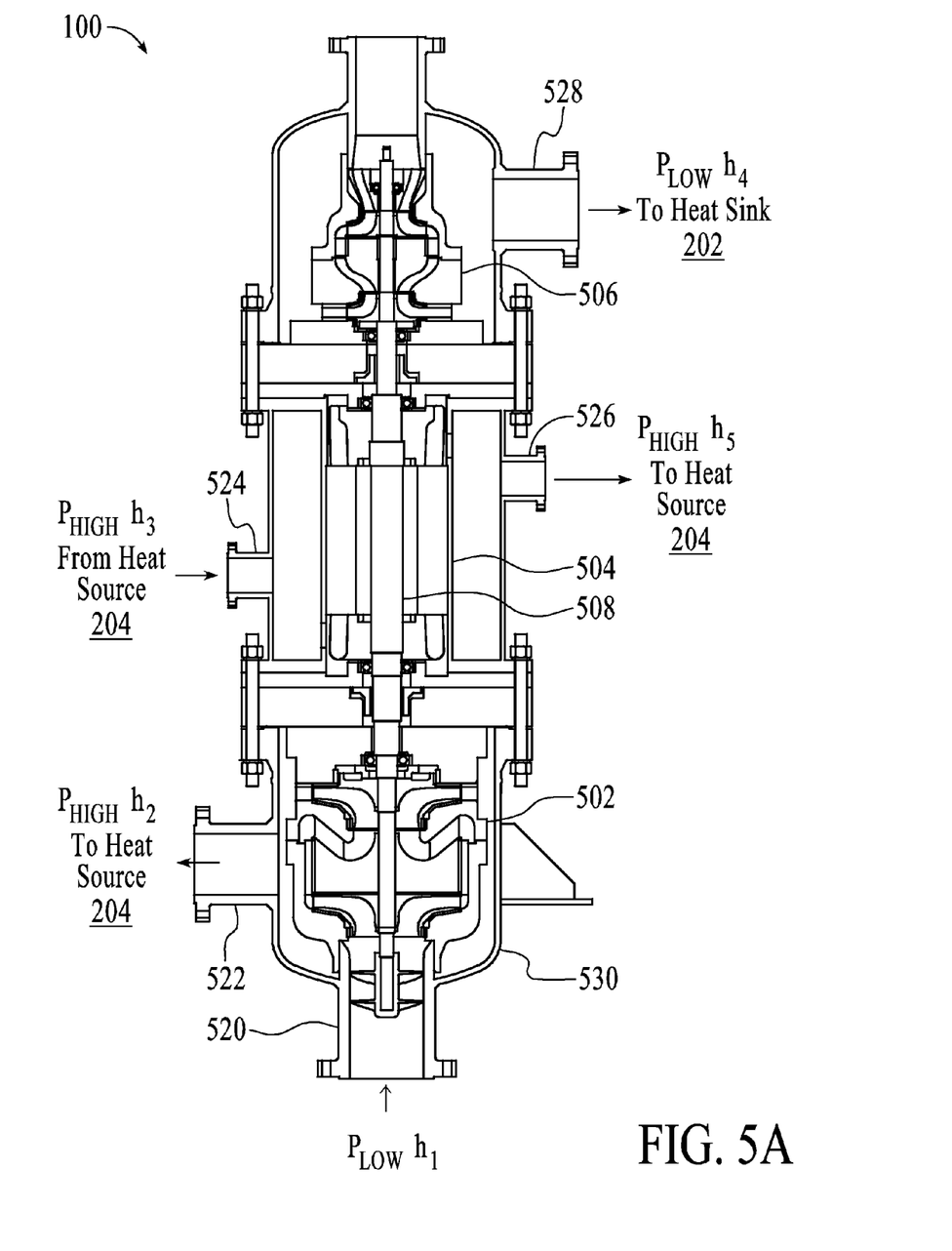
FIG. 5A is a representative cross sectional view of an embodiment of a pump two-phase expander generator of the present invention 100.

FIG. 5A is a representative cross sectional view of an embodiment of a pump two-phase expander generator of the present invention 100. As best shown in FIG. 5A, pump two-phase expander generator 100 is a compact assembly consisting of feed pump 502 at the bottom of the stack, induction generator 504 in the middle, and two-phase expander 506 at the top, all integrally mounted on one rotating axial shaft 508. The lower part of the system 100 is completely encased in a pressurized containment vessel 530. Pump two-phase expander generator 100 can perform Step 1 to 2 and Step 3 to 4 of the two-phase Rankine power cycle best described in FIGS. 2B and 2C. As best shown in FIG. 5A, low pressure working fluid in liquid state enters the pump 502 at the lower inlet nozzle 520, exits the pump at side outlet 522 to heat source 204 and passes internally through induction generator 504 housing, cooling induction generator 504, thus recovering the heat losses of generator 504. The working fluid exits through side outlet 526 to heat source 204. After passing through external heat source 204, the saturated two-phase working fluid reenters pump two-phase expander generator 100 at side inlet 524 and the high pressure saturated two-phase working fluid expands across two-phase expander 506, generating work and driving rotating shaft 508 and subsequently pump 502 and induction generator 504. The low pressure saturated working fluid then flows out of pump two-phase expander generator 100 through side outlet 528 to heat sink 202 where its internal energy is dissipated by passing across colder LNG at heat sink 202. The working fluid is thus converted back to low pressure liquid state. The cycle begins again as low pressure liquid phase working fluid reenters pump two-phase expander generator 100 at inlet 520.

In one embodiment, during start-up of pump two-phase expander generator 100 of the present invention, the induction generator 504 operates as an induction motor below the synchronous speed to provide power for feed pump. When the shaft power of the two-phase expander 506 is greater than the shaft power of the feed pump 502, the induction motor operates in the generator mode above the synchronous speed.

Figure 5B:
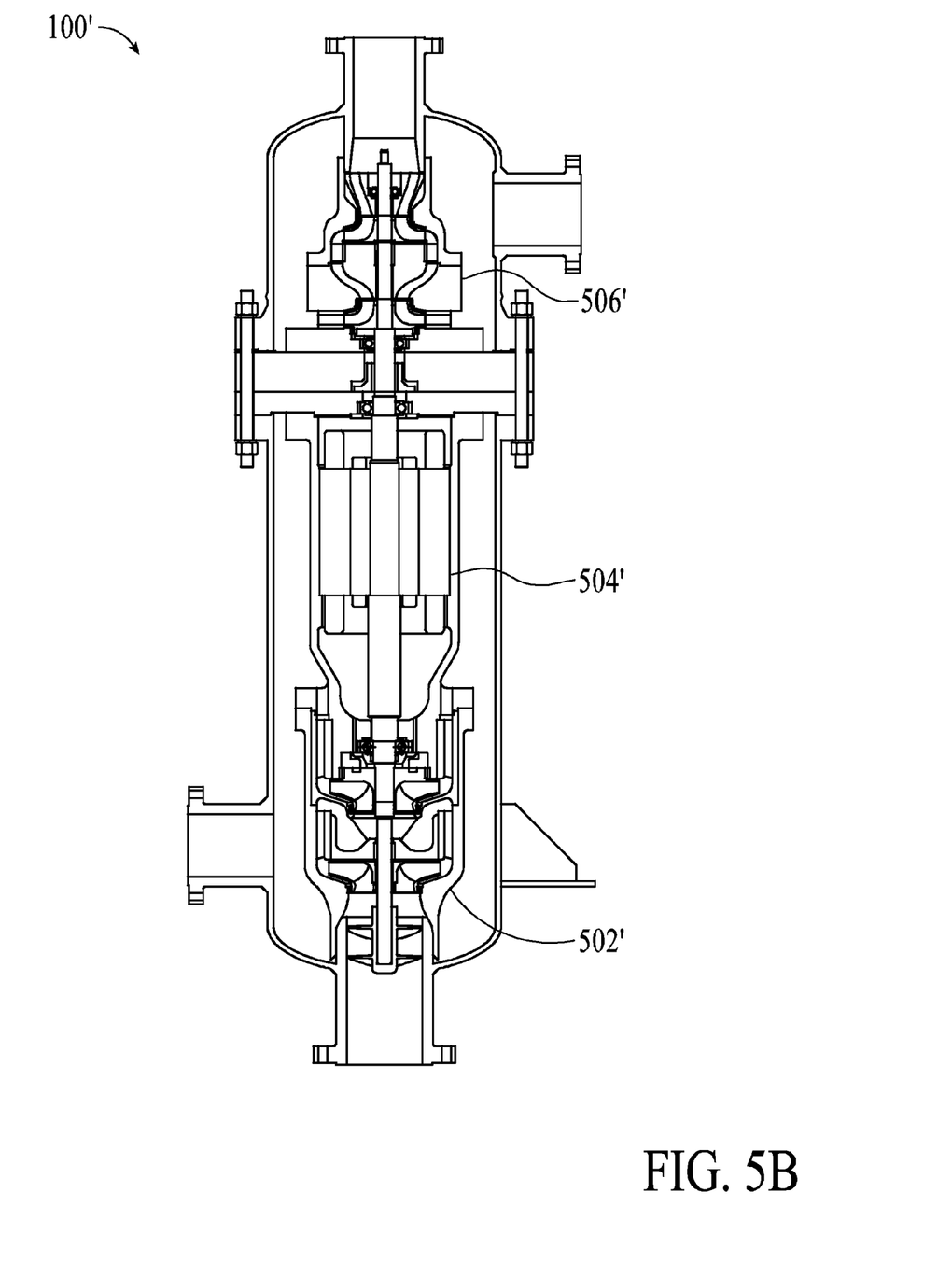
FIG. 5B is a representative cross sectional view of an alternative embodiment of a pump two-phase expander generator of the present invention 100'.

FIG. 5B is a representative cross sectional view of an alternative embodiment of a pump two-phase expander generator of the present invention 100'. In one alternative embodiment, the pressurized single phase working fluid passes directly from the pump 502' through the induction generator 504' housing, thus cooling the induction generator 504', and then exits to the side to pass though the heat source 204. In both embodiments, the leakage flow through the seal and the axial thrust is minimized due to equal pressure on both sides of the seal and opposing directions of the axial thrust forces.

The following advantages of the pump two-phase expander generator 100 of the present invention can be realized:
1. The expander work output is larger than the pump work input and the difference in work is converted by the generator into electrical energy.
2. The expander work output is larger than the pump work input and the difference in work is converted into electrical energy by the generator.
3. The losses of a separate pump motor are eliminated.
4. The losses of the induction generator are recovered and used, in addition to the heat from sea water and other heat sources, to heat the working fluid.
5. Any leakage of the working fluid is within a closed loop and occurs only between pump and expander.
6. Any leakage of the working fluid is minimized due to equal pressure on both sides of the seal, and small leakages are within a closed loop and occur only between pump, expander and generator.
7. The axial thrust is minimized due to opposing directions of the thrust forces decreasing the bearing load and increasing the bearing life.

Figure 6:
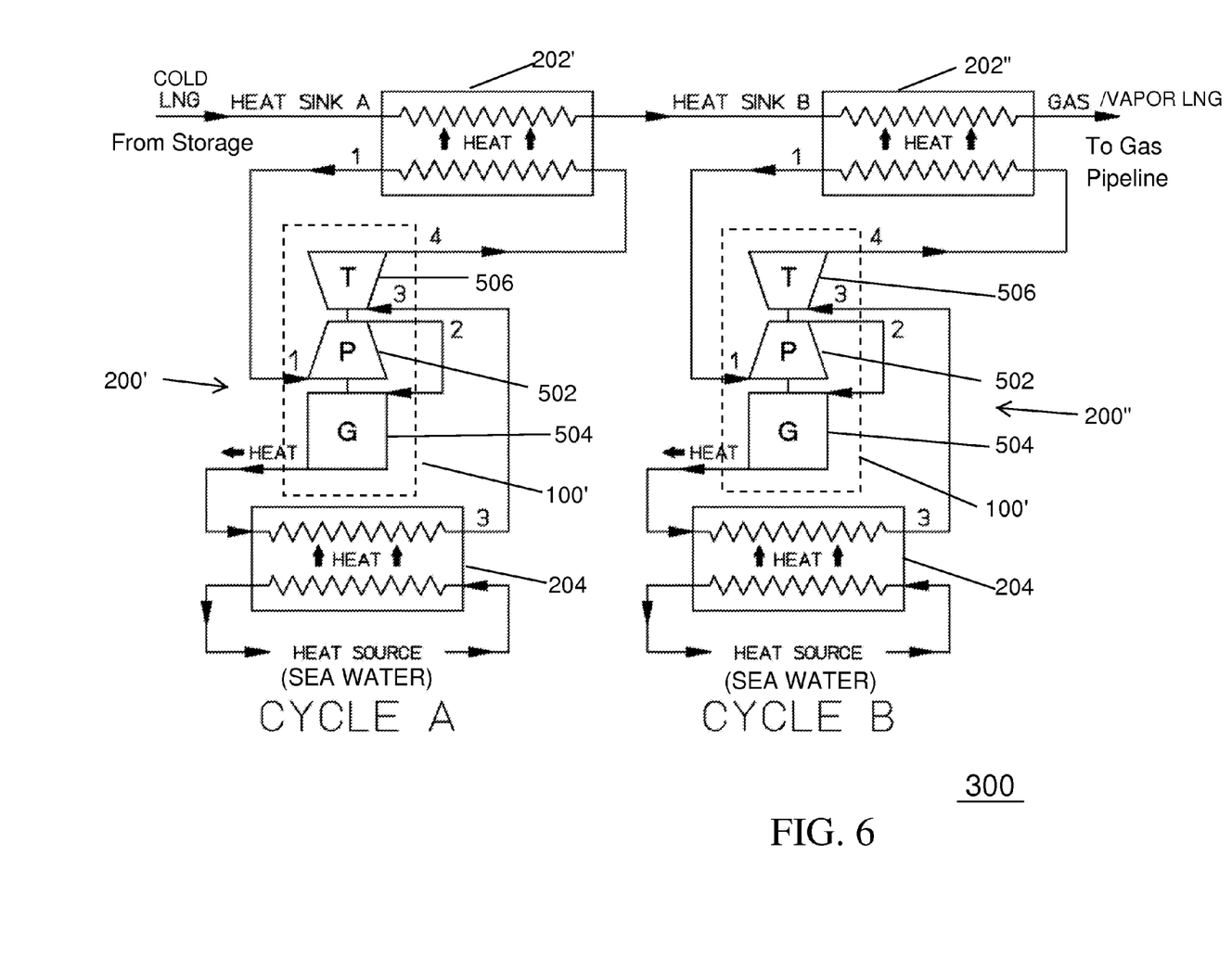
FIG. 6 is a representative schematic diagram showing the consecutive dual Rankine power cycle A and B power recovery system of the present invention 300 using two-phase expansion.

FIG. 6 is a representative schematic diagram showing the consecutive dual Rankine power cycle A and B power recovery system of the present invention 300 using two-phase expansion. In this alternative embodiment 300, dual Rankine power cycles A and B of the corresponding power recovery subsystems of the present invention 200' and 200", respectively, operate in series. In each individual cycle, there are the same process steps best shown in FIG. 4 and previously described correspond to the four described process steps of the two-phase Rankine power cycle shown in FIGS. 2B and 2C. The systems 200' and 200" of each cycle of the present invention 300 consists of heat sink 202, heat source 204 and pump two-phase expander generator 100' that further consists of pump 502, induction generator 504 and two-phase expander 506. Cold LNG from storage passes serially through heat sinks 202' of Rankine power cycle A 200' and heat sink 202" of Rankine power cycle B 200" during the regasification process. In practice, the temperature difference of the LNG between the storage and the gas pipe line is typically large, approximately 170 Celsius, and it is generally necessary to install heat sinks 202' and 202" or more (not shown) into the system 300 to achieve an efficient overall heat transfer. In one embodiment, heat sinks 202' and 202" are optimized for the local temperature range with different working fluids in the different cycles for the best heat transfer at the local temperature. The individual heat sinks 202' and 202" are at different temperature ranges and therefore the individual Rankine power cycles operate at different pressures and temperatures with different working fluids.

During the process of regasification at Rankine power cycle A 200', low pressure two-phase saturated working fluid flows out of pump two-phase expander generator 100 at two-phase expander 506 and passes through external heat sink 202'. The process of regasification of LNG occurs initially at heat sink 202'. Low pressure two-phase saturated working fluid absorbs heat from the colder LNG from the pipe line at the heat sinks 202'. While the working fluid condenses from saturated liquid-vapor two-phase to non-saturated liquid single phase, it serves as the heat source for the LNG regasification process and the LNG at the heat sink 202' is heated and partly or completely vaporized. The heated and partly/completely vaporized LNG then passes through heat sink 202" of Rankine power cycle B 200" to be further heated and vaporized. The heated and vaporized LNG is then discharged to the gas pipe line.

The partitioned dual, consecutive smaller Rankine power cycles A and B in the power recovery system of the present invention 300, and associated temperature increase of the LNG during the regasification process, enable the optimization of the overall power recovery. With the partition into two power cycles A and B 200' and 200", assembled in series as consecutive Dual Rankine Power Cycles A and B, the power recovery system 300 operates with high efficiency and operational flexibility.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A power recovery system for recovery of part of the required energy input during regasification of LNG using consecutive first and second Rankine power cycle sub-systems, the first and the second Rankine power cycle sub-systems of the power recovery system each comprising:
    a working fluid contained in a closed loop system, the closed-loop system comprising a pump two-phase liquid-vapor expander generator having (i) a feed pump, (ii) an induction generator and (iii) a two-phase liquid-vapor expander all mounted on a common, rotating axial shaft, the feed pump pumping liquid-phase working fluid to a high pressure for producing a pressurized liquid-phase working fluid, the pressurized liquid-phase working fluid then passing through the induction generator to become partly heated and vaporized therein, and then flowing out of the pump two-phase liquid-vapor expander generator;
    a first heat exchanger with a heat source, the first heat exchanger connected to the pump two-phase liquid-vapor expander generator via the closed-loop system, the heat source heating the pressurized liquid-phase working fluid flowing out of the induction generator into higher vapor content while it is passing through to produce a heated and pressurized two-phase working fluid, the heated and pressurized two-phase working fluid then re-entering the pump two-phase liquid-vapor expander generator at the two-phase liquid-vapor expander wherein the heated and pressurized two-phase working fluid expanded and driving the rotating center shaft, and subsequently the induction generator, the expanded two-phase working fluid flowing out of the pump two-phase liquid-vapor expander for cooling and condensation;
    a second heat exchanger with pressurized LNG as a heat sink, the second heat exchanger connected to the pump two-phase liquid-vapor expander generator via the pipe system, the heat sink absorbing the heat and cooling the expanded two-phase working fluid while it is passing through, the expanded two-phase working fluid condensed back to the liquid-phase working fluid state, the liquid-phase working fluid then re-entering the pump two-phase liquid-vapor expander generator at the feed pump, and repeating the cycle;

a heat sink pipeline feeding pressurized liquefied natural gas to the second heat exchanger of the first Rankine power cycle sub-system, the heat sink pipeline subsequently carrying the heated, pressurized LNG with a higher vapor content discharged from a sink of the first Rankine power cycle sub-system and feeding to the heat sink of the second Rankine power cycle sub-system, eventually carrying the further heated, fully vaporized and pressurized LNG discharged out of the power recovery system; and a casing containing the entire expander generator assembly; a stationery flat circular nozzle ring portion at the bottom of the two-phase liquid-vapor expander generator assembly, the nozzle ring portion further having a center aperture and a plurality of converging nozzles on its rim for generation of high velocity vortex flow of the pressurized and heated two-phase working fluid as it flows through; a rotating turbine runner portion sitting on to of the aperture of the nozzle ring portion.

2. The LNG regasification power recovery system of claim 1 in which the working fluid, operational conditions of the first and the second Rankine power cycle sub-systems are identical.

3. The LNG regasification power recovery system of claim 1 in which the working fluid, operational conditions of the first and the second Rankine power cycle sub-systems are different.

4. The LNG regasification power recovery system of claim 1 in which the heat source is sea water.

5. The LNG regasification power recovery system of claim 1 in which the heat source is steam.

6. The LNG regasification power recovery system of claim 1 in which the heat sink is pressurized liquefied natural gas.

7. The LNG regasification power recovery system claim 1 in which the working fluid is liquefied natural gas.

8. A method for power recovery using consecutive, dual Rankine power cycles A and B operated in series in an LNG regasification plant, the method comprising the following steps:

in each cycle, passing the working fluid through heat exchangers and a pump two-phase expander generator, the pump two-phase expander generator consisting of a compact assembly of a pump, a two-phase expander and an induction generator integrally mounted on one rotating, axial shaft, such that the following steps are performed in the following sequence:

in a first step in each cycle, with work input, the pump pressurizes a non-saturated liquid single phase working fluid from low pressure to high pressure for producing a pressurized non-saturated liquid single-phase working fluid;

in a second step in each cycle, the pressurized non-saturated liquid single phase working fluid is heated and partially vaporized by passing through the induction generator, and a first heat exchanger with the heat provided by sea water or other heat sources;

in a third step in each cycle, the pressurized and heated two-phase saturated working fluid flowing out of the first heat exchanger expands from high-pressure to low-pressure across the two-phase expander for generating a work output;

in a fourth step in each cycle, the low pressure two-phase saturated working fluid flowing out of the two-phase expander passes through a second heat exchanger with a heat sink, such that the low pressure two-phase saturated working fluid condenses from saturated liquid-vapor two-phase to non-saturated liquid single phase; this condensation process serves as the heat source for the LNG regasification process and the LNG at the second heat sink is heated and partly or completely vaporized;

passing the heated and partly or completely vaporized LNG from the second heat exchanger of the Rankine power cycle A through a heat sink of a second heat exchanger of the Rankine power cycle B to be further heated and vaporized; and discharging the heated and vaporized LNG at the heat sink of the second heat exchanger of the Rankine power cycle B to a gas pipe line;

wherein the expander generator of each cycle further comprises: a casing containing the entire expander generator; a stationery flat circular nozzle ring portion at the bottom of the two-phase expander, the nozzle ring portion further having a center aperture and a plurality of converging nozzles on its rim for generation of high velocity vortex flow of the pressurized and heated two-phase saturated working fluid as it flows through; a rotating turbine runner portion sitting on to of the aperture of the nozzle ring portion.

9. A method for power recovery using a plurality of consecutive, Rankine power cycles operated in series in an LNG regasification plant, the method comprising the following steps:

in each cycle, passing a non-saturated liquid single phase working fluid through heat exchangers and a pump two-phase expander generator, the pump two-phase expander generator consisting of a compact assembly of a pump, a two phase expander and an induction generator integrally mounted on one rotating, axial shaft, such that the following steps are performed in the following sequence:

in a first step in each cycle, with work input, the pump pressurizes the non-saturated liquid single phase working fluid from low pressure to high pressure for producing a pressurized non-saturated liquid single phase working fluid;

in a second step in each cycle, the pressurized the non-saturated liquid single phase working fluid is heated and partially vaporized by passing through the induction generator, and a first heat exchanger with the heat provided by sea water or other heat sources;

in a third step in each cycle, the pressurized and heated two-phase saturated working fluid flowing out of the first heat exchanger expands from high-pressure to low-pressure across the two-phase expander for generating a work output;

in a fourth step in each cycle, the low pressure two-phase saturated working fluid flowing out of the two-phase expander passes through a second heat exchanger with a heat sink, such that the low pressure two-phase saturated working fluid condenses from saturated liquid-vapor two-phase to non-saturated liquid single phase; this condensation process serves as the heat source for the LNG regasification process and the LNG at the second heat sink is heated and partly or completely vaporized;

passing the heated and partly or completely vaporized LNG from the second heat exchanger of one Rankine power cycle through a heat sink of a heat exchanger of an adjacent Rankine power cycle to be further heated and vaporized; and discharging the heated and vaporized LNG at the heat sink of the second heat exchanger of the adjacent Rankine power cycle to a gas pipe line;

wherein the expander generator of each cycle further comprises: a casing containing the entire expander generator; a stationery flat circular nozzle ring portion at the bottom of the two-phase expander, the nozzle ring portion further having a center aperture and a plurality of converging nozzles on its rim for generation of high velocity vortex flow of the pressurized and heated two-phase saturated working fluid as it flows through; a rotating turbine runner portion sitting on top of the aperture of the nozzle ring portion.

* * * * *